E. C. GAGE.
COMBINED CORN-PLANTER AND CULTIVATOR.
No. 186,244. Patented Jan. 16, 1877.
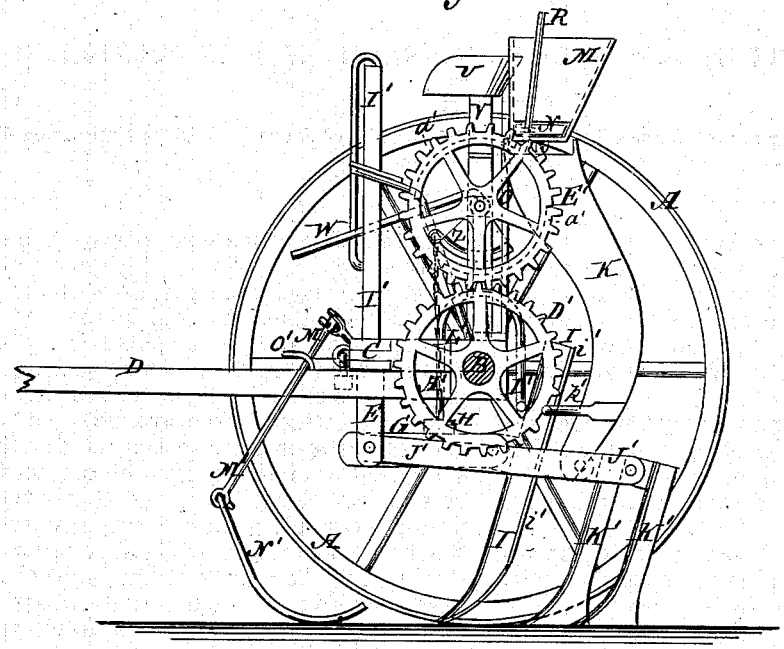
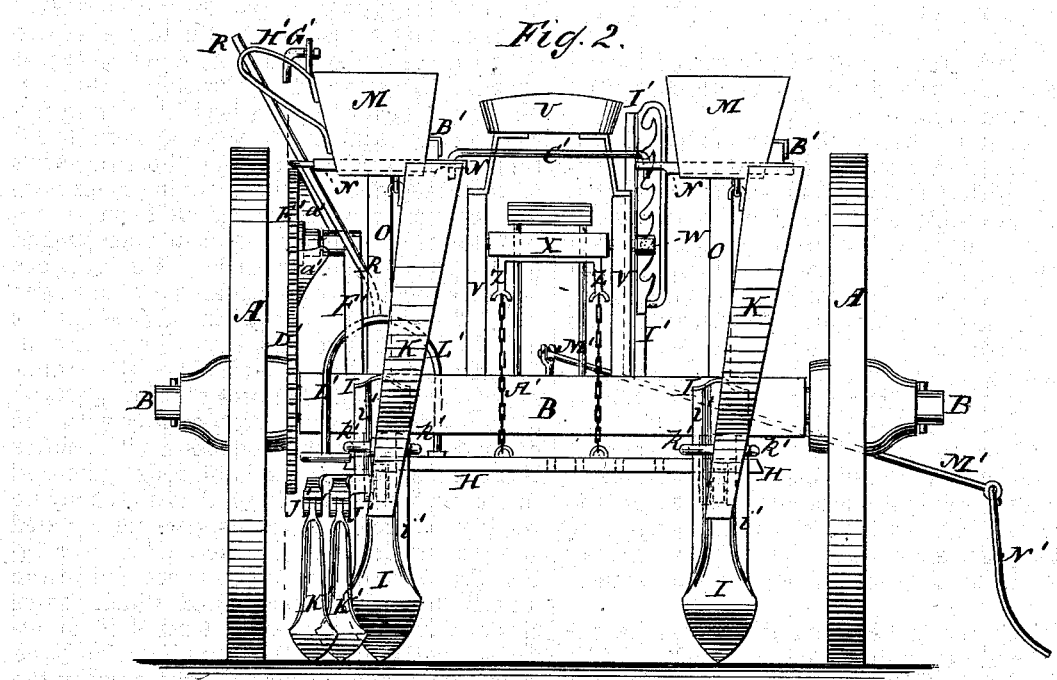

UNITED STATES PATENT OFFICE.

ELI CHAPMAN GAGE, OF WITOKA, MINNESOTA.

IMPROVEMENT IN COMBINED CORN-PLANTER AND CULTIVATOR.

Specification forming part of Letters Patent No. 186,244, dated January 16, 1877; application filed October 23, 1876.

*To all whom it may concern:*

Be it known that I, ELI CHAPMAN GAGE, of Witoka, in the county of Winona and State of Minnesota, have invented a new and useful Improvement in Combined Corn-Planter and Cultivator, of which the following is a specification:

Figure 1 is a side view of my improved machine, one of the wheels being removed. Fig. 2 is a rear view of the same.

Similar letters of reference indicate corresponding parts.

The object of this invention is to improve the construction of the corn-planter for which Letters Patent No. 146,060, were granted to me December 30, 1873, so as to make it more convenient in use, and more effective in operation.

The invention will first be described in connection with the drawing, and then pointed out in the claims.

A are the wheels. B is the axle. C is a bar placed in front of the axle B, and connected with it by short bars. D are the shafts, which are attached to the bar C and axle B, either or both. To the bar C are attached downwardly-projecting arms or hangers E to the lower ends of which are pivoted the forward ends of the drag-bars G. Several holes are formed in the cross-bar C to receive the hangers E to enable them to be adjusted wider apart or closer together, according to the required distance apart of the rows. The drag-bars G are connected near their rear ends by a cross-bar, H, to keep them in proper relative position. Several holes are formed in the cross-bar H to receive the connecting-bolts, so that the rear ends of the drag-bars G may be adjusted at the same distance apart as their forward ends.

To the rear end of each of the drag-bars G is pivoted the middle part of the shank of a plow, I, for opening a furrow to receive the seed, which shanks are made hollow or open upon their rear sides to receive the lower ends of the spouts K, so that the seed may be conducted into the furrows before said furrows can become partially filled by the falling in of the soil. The seed is covered by coverers attached to the lower parts of the plows I, (but which are not shown in the drawing.)

To the sides of the lower parts of the spouts K are attached hooks $k'$, which hook around flanges $i'$ formed upon the sides of the plow-shanks I, so that the said plows may move up and down upon said spouts freely, to accommodate themselves to the surface of the ground, and to enable them to be readily raised from and lowered to the ground. The upper ends of the spouts K are connected with and supported from the bottom of the seed-hoppers M, in such positions as to receive the seed from the dropping-slides N, which work upon the bottoms of the hoppers through holes in their sides. The parts of the slides N, that pass in and out of the hoppers M, have holes formed in them to receive the seed, carry it out, and allow it to drop into the spouts K. As the slides N pass out of the hoppers M to drop the seed, they pass beneath a rubber pad or brush, B', attached to the side of the hoppers to prevent any more seed from being carried out by said slides than enough to fill their holes, the said slides at the rear edges of the upper ends of the dropping-holes having inclined grooves formed in them to prevent the seed from being broken when pushed back by the pad or brush B'. The hoppers M are supported by standards O, the lower ends of which are secured in mortises in the axle B. Several mortises may be formed in the axle B to receive the ends of the standards O, so that the hoppers may be adjusted at a distance apart corresponding with the distance apart of the openers I. The slides N are connected by detachable rods C', hooked into their adjacent ends so that they may be readily changed when the hoppers are adjusted wider apart or closer together. R is a spring-bar, the lower end of which is secured to the axle B, near the wheel A, and which passes through a hole or keeper formed in or attached to the end of the dropping-slide N, so that the said slide may be operated by the movements of the said spring R.

To the inner end of the hub of the wheel A, or to the inner side of said wheel, is attached a gear-wheel, D', into the teeth of which mesh the teeth of a gear-wheel, E', pivoted to a standard, F'. The lower end of the standard F' is attached to the axle B. To the inner side of the gear-wheel E' are attached, or upon it are formed, one or more inclines or cams, a', which, at each revolution of the said wheel E', strike the spring-bar R and force it toward the hopper M', pushing the slide N inward to bring its dropping-holes out of the hopper M, and over the spout K, to drop the seed. The slides N are drawn outward to bring their dropping-holes within the hoppers M, to again receive seed, by the elasticity of the spring-bar R.

By this construction the gear-wheel E' may be detached and replaced by a larger or a smaller one when it is desired to drop the hills farther apart or closer together.

G' is a hook or catch pivoted or attached to the upper part of the hopper M, or to an arm attached to said hopper, to receive the upper end of the spring-bar R and hold it back from the inclines a', so that the machine may be turned around and drawn from place to place without operating the dropping-slides N. H' is a guard attached to the outer side of the hopper M, to prevent the spring-bar R from being pushed to the rearward by the friction of the inclines a'. U is the driver's seat, which is attached to the support V, secured to the axle B. W is a lever attached to or formed upon the end of a shaft, X, which works in bearings in the support V of the driver's seat U. To the shaft X are attached arms or segments of pulleys Z, to which are attached the ends of chains A', the other ends of which are attached to the cross-bar H, so that by operating the lever W the openers I may be raised from the ground for convenience in turning and in passing from place to place. The lever W passes through a slot formed in, or a keeper attached to, the standard I', and is held in place by teeth formed in, or attached to, the said standard. The lower end of the standard I' is attached to the cross-bar C. The lever W may be operated by the driver with his foot. J' are two plow-beams placed at the side of the drag-bars G, and to the forward ends of which are attached two straps, which are bent inward and then forward, and are pivoted to the lower ends of the hangers E, attached to the cross-bar C. The coupling-straps are made of such a length as to bring the plows at a proper distance from each other and from the drag-bars G. To the rear ends of the plow-beams J' are secured the upper ends of the shanks of the plows K' in such a way that should the said plows strike an obstruction they will swing back and prevent the machine from being broken. The plows J' K' enable the machine to be used as a cultivator, and either with or without the seed-dropping device. L' is a rod, one end of which is attached to the cross-bar H. The rod L' is bent into U-form, passes over the axle B, and to its other end is attached a cross-head, upon the arms of which the plows J' K' may be hung to support them away from the ground when turning and when passing from place to place. To the center of the cross-bar C is pivoted the end of a rod, M', by means of a bolt, pin, staple, or other fastening that will enable the said rod to be turned to either side of the machine. The rod M' is made of such a length that its outer end may be directly over the row of hills last planted, when the machine is in position for planting the next row, so as to serve as a gage to the driver in guiding the machine. To the outer end of the rod M' is pivoted the end of a rod, N', which is curved, and is made of such a length as to drag along the ground, and thus indicate more surely when the machine is in proper position. The draft-strain upon the rods M' N' is sustained by hooks O', attached to the shafts D.

Having thus described my invention, I claim as new and desire to secure by Letters Patent—

1. The gear-wheel D, mounted on the hub of one of the driving-wheels A, and the gear-wheel C', having inclines or cams a', and mounted on bar F', in combination with spring-bar, seed-slide, and elevated hopper, all substantially as shown and described, for the purpose specified.

2. The bent rod L', provided with a cross-head upon its free end, in combination with the cross-bar H and the side plows J' K', substantially as herein shown and described.

ELI CHAPMAN GAGE.

Witnesses:
N. B. MENDER,
JACOB STORY.